(12) United States Patent
Cheriton et al.

(10) Patent No.: US 12,474,206 B2
(45) Date of Patent: Nov. 18, 2025

(54) FIBRE OPTIC FILTER REMOTE GAS CORRELATION SENSOR

(71) Applicant: National Research Council of Canada, Ottawa (CA)

(72) Inventors: Ross Cheriton, Ottawa (CA); Siegfried Janz, Ottawa (CA); Adam Densmore, Victoria (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 0 days.

(21) Appl. No.: 17/926,047

(22) PCT Filed: May 19, 2021

(86) PCT No.: PCT/CA2021/050678
§ 371 (c)(1),
(2) Date: Nov. 17, 2022

(87) PCT Pub. No.: WO2021/232153
PCT Pub. Date: Nov. 25, 2021

(65) Prior Publication Data
US 2023/0184587 A1 Jun. 15, 2023

Related U.S. Application Data

(60) Provisional application No. 63/122,255, filed on Dec. 7, 2020.

(51) Int. Cl.
*G01J 3/02* (2006.01)
*G01J 3/26* (2006.01)
(Continued)

(52) U.S. Cl.
CPC .......... *G01J 3/0218* (2013.01); *G01J 3/0297* (2013.01); *G01J 3/26* (2013.01); *G01J 3/433* (2013.01); *G01N 21/359* (2013.01)

(58) Field of Classification Search
CPC .......... G01J 3/0218; G01J 3/0297; G01J 3/26; G01J 3/433; G01J 3/45; G01J 3/453; G01N 21/359; G01N 2021/3155; G02B 26/001
See application file for complete search history.

(56) References Cited

U.S. PATENT DOCUMENTS 6,504,616 B1 * 1/2003 Haber ................ G02B 6/29398
356/519
9,052,291 B2 6/2015 He et al.
(Continued)

FOREIGN PATENT DOCUMENTS

CN 2509580 Y 9/2002
CN 1715876 A 1/2006
(Continued)

OTHER PUBLICATIONS

David P. Baldwin, Daniel S. Zamzow, and Arthur P. D'Silva, "High-Resolution Spectroscopy Using an Acousto-Optic Tunable Filter and a Fiber-Optic Fabry-Perot Interferometer," Appl. Spectrosc. 50, 498-503 (1996) (Year: 1996).*
(Continued)

*Primary Examiner* — Dominic J Bologna
*Assistant Examiner* — Jonathon Cook
(74) *Attorney, Agent, or Firm* — Aird & McBurney LP

(57) ABSTRACT

A method for detecting and identifying a remote gas, the method comprising the steps of: receiving a light wave associated with the remote gas; coupling the light wave into a single mode fibre; transmitting the light wave via the single mode fibre into a filter comprising a fibre-based tunable cavity; modulating the cavity length of the filter transmission window to cause a detected modulated signal that is proportional to the spectral feature; and processing the
(Continued)

signal using a lock-in amplifier capable of low-pass filtering and out-of-frequency noise rejection.

16 Claims, 5 Drawing Sheets

(51) Int. Cl.
G01J 3/433 (2006.01)
G01N 21/359 (2014.01)

(56) References Cited

U.S. PATENT DOCUMENTS

2019/0025203 A1* 1/2019 Koulikov ............. G01N 21/716
2024/0180428 A1* 6/2024 Islam .................. A61B 5/7203

FOREIGN PATENT DOCUMENTS

CN 103308480 A 9/2013
CN 108801946 A 11/2018

OTHER PUBLICATIONS

Andrew D. Sappey, Pat Masterson, and Ben A. Sappey, "Passive optical heterodyne spectroscopy measurement of the Doppler shift of Fe(I) lines induced by the rotational velocity of the Sun," J. Opt. Soc. Am. B 37, 3829-3840 (2020) (Year: 2020).*
Coddington, I., et al. "Dual-comb spectroscopy." Optica 3.4 (2016): 414-426.
Coddington, I., et al. "Coherent dual-comb spectroscopy at high signal-to-noise ratio." Physical Review A 82.4 (2010): 043817.
Perot, A., and Fabry, C. "On the application of interference phenomena to the solution of various problems of spectroscopy and metrology." The Astrophysical Journal 9 (1899): 87.
Kuhn, J., et al. "Towards imaging of atmospheric trace gases using Fabry-Pérot interferometer correlation spectroscopy in the UV and visible spectral range." Atmospheric Measurement Techniques 12.1 (2019): 735-747.
Kuhn, J., et al. "A Fabry-Perot interferometer-based camera for two-dimensional mapping of SO2 distributions." Atmospheric Measurement Techniques 7.11 (2014): 3705-3715.
Ma, W., et al. "CO2 Gas Sensing Using Optical Fiber Fabry-Perot Interferometer Based on Polyethyleneimine/Poly (Vinyl Alcohol) Coating." IEEE Photonics Journal 9.3 (2017): 1-8.
Jiang, Y., and Ding, W. "Recent developments in fiber optic spectral white-light interferometry." Photonic Sensors 1.1 (2011): 62-71.
Zhang, L., et al. "A diaphragm-free fiber Fabry-Perot gas pressure sensor." Review of Scientific Instruments 90.2 (2019): 025005.
Costa, G. K. B., et al. "In-fiber Fabry-Perot interferometer for strain and magnetic field sensing." Optics Express 24.13 (2016): 14690-14696.
Li, H., et al. "Low-cost, high-performance fiber optic Fabry-Perot sensor for ultrasonic wave detection." Sensors 19.2 (2019): 406.
Yin, X., et al. "High-spatial-resolution ultrasonic sensor using a fiber-optic Fabry-Perot interferometer." Optics Communications 453 (2019): 124422.
Zhou, B., et al. "Hot cavity optical fiber Fabry-Perot interferometer as a flow sensor with temperature self-calibrated." Journal of Lightwave Technology 34.21 (2016): 5044-5048.
Pevec, S., and Donlagic, D. "Miniature fiber-optic Fabry-Perot refractive index sensor for gas sensing with a resolution of 5x10-9 RIU." Optics Express 26.18 (2018): 23868-23882.
Wu, S., et al. "Flexible optical fiber Fabry-Perot interferometer based acoustic and mechanical vibration sensor." Journal of Lightwave Technology 36.11 (2018): 2216-2221.
Javernik, A., and Donlagic, D. "Miniature, micro-machined, fiber-optic Fabry-Perot voltage sensor." Optics Express 27.9 (2019): 13280-13291.
Mozafari, M., et al. "Design and fabrication of piezo-optical Fabry-Perot voltage sensor." 2008 IEEE Avionics, Fiber-Optics and Photonics Technology Conference. IEEE, 2008.
Zhou, B., et al. "Optical fiber fiber Fabry-Perot filter with tunable cavity for high-precision resonance wavelength adjustment." Journal of Lightwave Technology 33.14 (2015): 2950-2954.
Hays, D., et al. "A hybrid MEMS-fiber optic tunable Fabry-Perot filter." Journal of Microelectromechanical Systems 19.2 (2010): 419-429.
Jáuregui-Vázquez, D., et al. "An all fiber intrinsic Fabry-Perot interferometer based on an air-microcavity." Sensors 13.5 (2013): 6355-6364.
Ismail, N., et al. "Fabry-Pérot resonator: spectral line shapes, generic and related Airy distributions, linewidths, finesses, and performance at low or frequency-dependent reflectivity." Optics Express 24.15 (2016): 16366-16389.
Abrarov, S. (n.d.). "A rational approximation of the Voigt function." (https://www.mathworks.com/matlabcentral/fileexchange/50355-a-rational-approximation-of-the-voigt-function), MATLAB Central File Exchange. Retrieved Nov. 24, 2022.
International Search Report issued in International Application No. PCT/CA2021/050678, Aug. 18, 2021, 2 pages.
Written Opinion of the International Searching Authority issued in International Application No. PCT/CA2021/050678, Mar. 18, 2021, 4 pages.
Cui, Y., et al. "A dual-cavity Fabry-Perot interferometric fiber-optic sensor for the simultaneous measurement of high-temperature and high-gas-pressure." IEEE Access 8 (2020): 80582-80587.
Vargas-Rodríguez, E., et al. "Design of CO, CO2 and CH4 gas sensors based on correlation spectroscopy using a Fabry-Perot interferometer." Sensors and Actuators B: Chemical 137.2 (2009): 410-419.
Vargas-Rodríguez, E. "Optical gas sensors based on correlation spectroscopy using a Fabry-Perot interferometer." Diss. University of Southampton, 2007.

* cited by examiner

FIBRE OPTIC FILTER REMOTE GAS CORRELATION SENSOR

FIELD

Aspects of the disclosure relate to methods and systems for detecting and identifying a remote gas.

BACKGROUND

Absorption spectroscopy is an important tool for the remote determination of molecular composition of a target gas where direct interaction with a target is not practical or feasible. Passive remote sensing is required where active sensing either becomes impractical or infeasible to reach distant targets. For astronomical targets, molecular composition is characterized through absorption or emission spectroscopy, where a pattern of spectral features act as a unique "fingerprint" of their molecular or atomic constituents. Dispersive spectroscopy is frequently used to split up incoming light by wavelength into a multichannel detector to measure the spectrum and then processed and interpreted to infer the composition. Generally, such methods are limited to bright sources where the signal to noise ratio is high. To determine faint spectral features, the measured spectrum is cross-correlated with a filter of known transmission characteristics to search for a significant signal at the point of optimum overlap. Cross-correlation spectroscopy is typically used as a post-processing step from a generated reference spectrum, however the data acquisition still suffers from the low throughput and signal to noise ratios introduced by dispersive spectrometers.

Cavity-based spectroscopy techniques, such as differential optical absorption spectroscopy, can be highly sensitive due to a comparison with a reference spectrum, but spectral acquisition is still required. Dual-comb spectroscopy is another correlation-based technique that correlates two frequency combs to produce a radio-frequency signal for heterodyne detection, but suffers from high cost, limited range, and significant electrical complexity [1,2]. Fabry-Perot (FP) filters comprise a resonant cavity that generates longitudinal modes at resonant wavelengths [3]. Non-fibre-based FP interferometers have been used for spectroscopy of remote gases such as in bulk optical configurations, by modulating the cavity length and observing the modulated signal [4-6]. The wavelength of the transmission modes shift rapidly while slowly changing the free spectral range of the cavity modes. While such cavities have existed for years in bulk optical systems, recent implementations have been realized on purely fibre-optics platforms. Fiber optic-based technologies hold many advantages over their bulk equivalents in regards to routing, cost, weight, propagation distance, size, and stability. Fibre FP cavities have been used in a tremendous variety of optical sensors, including for temperature, local gas [7], white light interferometry [8], pressure [9], strain [10], ultrasound [11,12], magnetic field [10], flow [13], refractive index [14], vibration [15], and voltage [16]. Tunable fibre FP (FFP) cavities have been recently realized through mechanical tuning of the gap between two cleaved fibre ends. The separation between each fibre facet can be controlled piezoelectrically [6,17], thermally [18], through microelectromechanical systems (MEMS) [19], or uncontrolled such that the separation is proportional to a measurement quantity.

Fibre FPs have been realized for detection of gas in hollow core fibres [20], but have not yet been used in remote gas sensing. Molecular absorption features span the visible, near infrared and mid infrared spectrum as a result of vibronic and rotational modes. In the case of atomic absorption, emission features arise from atomic transitions between electronic states in each atom. Sensing of remote gases involves determining spectral features at these wavelengths to infer gas presence. Dispersive spectroscopy is routinely used to measure the spectrum to directly observe the spectral features. However, the signal-to-noise ratio in dispersive spectroscopy is diminished through the division of photons into a detection array. Also, losses from the use of diffraction gratings and other optical elements diminish the throughput of this detection technique.

It is an object of the present disclosure to mitigate or obviate at least one of the above-mentioned disadvantages.

SUMMARY

In one aspect, there is provided a method for detecting and identifying a remote gas, the method comprising the steps of:
  receiving a light wave associated with the remote gas;
  coupling the light wave into a single mode fibre;
  transmitting the light wave via the single mode fibre into a filter comprising a fibre-based tuneable cavity;
  modulating the cavity length of the filter transmission window to cause a detected modulated signal that is proportional to the spectral feature; and
  processing the signal using a lock-in amplifier capable of low-pass filtering and out-of-frequency noise rejection.

In another aspect, there is a gas sensing system comprising:
  a fibre collimator for receiving a light wave associated with a remote gas;
  a single mode fibre for receiving the light wave coupled thereinto by the fibre collimator;
  a modulator for modulating the cavity length;
  a single-channel photodetector for detecting a modulated signal that is proportional to the spectral feature;
  a single channel lock-in amplifier capable of low-pass filtering and out-of-frequency noise rejection.

In another aspect, there is provided a fibre-based spectrally tuneable filter for a real time correlation filter with light from an astronomical object or remote target to determine the presence of a certain gas.

Advantageously, the gas sensing system achieves accurate and high sensitivity spectral characterization of molecular components of distant targets such as exoplanets and stars by extracting substantially small spectral signatures from complex spectral backgrounds. In addition, multiple astronomical targets may be addressed in a single field of view using fibre optic sampling at the focal plane. Photometric techniques of the gas sensing system combine all light from a wide wavelength range into a single detection element, are usually inherently simpler, and can operate with lock-in amplification of the signal for signal extraction under extremely low signal-to-noise conditions.

Furthermore, the gas sensing system in the present application is substantially low-power, low-cost, light, compact, and has a much reduced data footprint. The gas sensing system is capable of operating with a noisy input light and has a virtually limitless target distance. In addition, the system is all fibre-based, stable, and does not include any moving parts, except for a fibre piezoelectric drive. Other advantages include the lack of a laser or a detection array or complex readout circuit electronics.

The gas sensing system in the present application employs an all-fibre Fabry-Perot filter correlation spectroscopy technique which can detect remote gases through their absorption features in the near-infrared. Through simulations it can be demonstrated that such a technique can identify gases in a pure $CO_2$ spectrum, pure CO spectrum, a 50/50 mixture, or methane ($CH_4$) as well as with a measured near-infrared spectrum of Venus. In one implementation, the radial velocity of Venus is determined through the phase shift of the lock-in signal, a technique that leverages the noise-reduction benefits of lock-in amplification and single channel detector to deliver a sensor tailored to $CO_2$ detection, but can be tailored to many other gases with quasi-periodic absorption lines, and should be viable even with molecules with complex absorption spectra like water. Such a technique can be extended to the visible or mid-infrared to support the detection of other gases or increased sensitivity. This technique can be used in remote sensing for emissions monitoring, in astronomy for star surveys and exoplanet detection and characterization.

DETAILED DESCRIPTION

Figure 1:
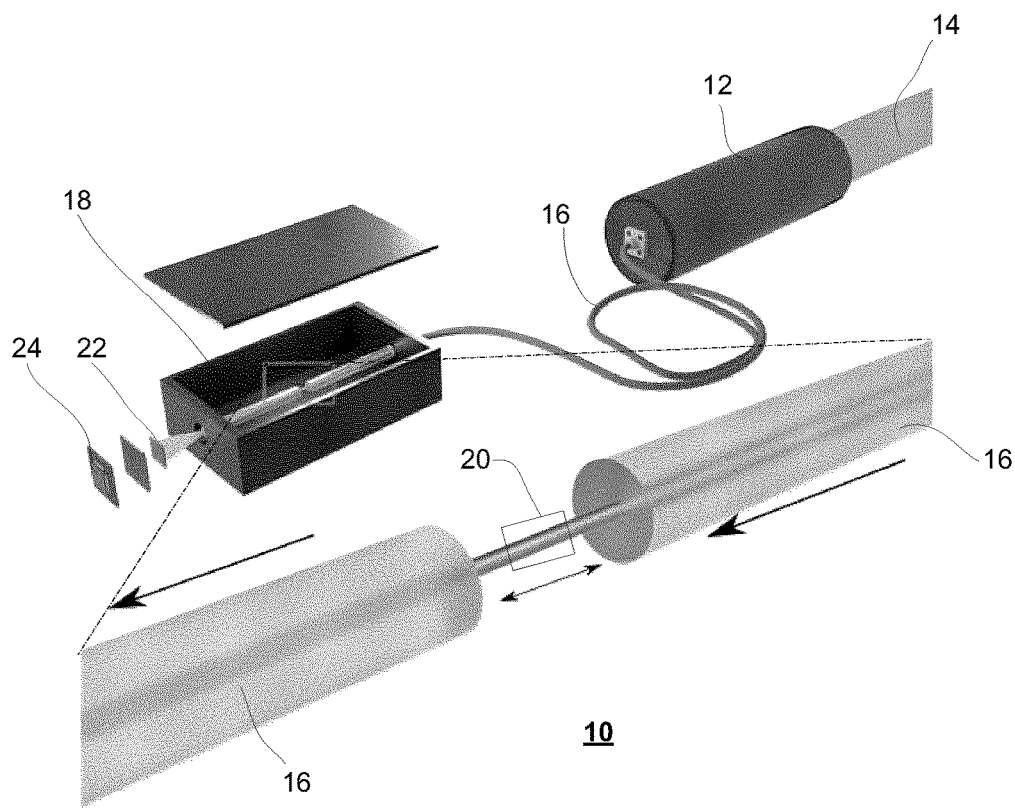
FIG. 1 shows a schematic of a fibre optic correlation spectroscopy system.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Referring to FIG. 1, there is shown a schematic of a fibre optic correlation spectroscopy system 10 capable of remote gas detection, identification and radial velocity measurements using a single channel lock-in amplification technique. System 10 comprises fibre collimator 12 which receives light 14 from free space and couples the light 14 into single mode fibre 16 for transmission into filter 18 with fibre-based tunable cavity 20. In one implementation, filter 18 is a Fabry-Perot (FP) filter with resonant cavity 20 that generates longitudinal modes at resonant wavelengths. FFP filter 18 transmission window is modulated through the spectral features, and single-channel photodetector 22 detects the modulated signal that is proportional to the spectral feature of the remote gas. Lock-in amplifier 24 processes the signal by performing low-pass filtering and out-of-frequency noise rejection.

Figure 2:
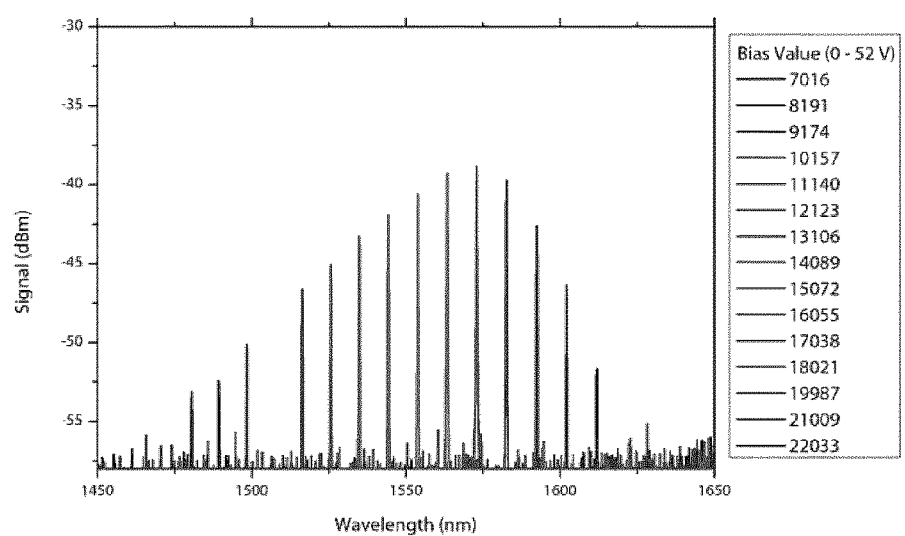
FIG. 2 shows a transmission spectra of a tunable fibre Fabry-Perot (FP) filter as a function of electrical bias.

In a simulation, the transmission spectrum of a FP mode is Lorenztian in shape [21], with a spectral profile as a function of wavelength according to $$T_{FP}(\lambda, \lambda_0, \gamma) = \left(\frac{1}{\pi\gamma}\right)\frac{\gamma^2}{\gamma^2 + (\lambda - \lambda_0)^2},$$

where $\gamma$ is the half width at half max, $\lambda$ is the wavelength of light, and $\lambda_0$ is the centre wavelength of the peak. Other resonances are separated by over 100 nm in bandwidth so that only a single transmission window is visible over a large bandpass. The FFP filter 18 transmission spectrum was measured as a function of electrical bias, as shown in FIG. 2. The non-uniform transmission is due to the super luminescent light emitting diode (SLED) emission spectrum. In the simulation, the fibre FP filter 18 transmission spectrum is simulated using a Lorenztian profile with a spectral width that matches that of the experimental filter (15 GHz or 220 pm).

The gas absorption lines take the shape of Voigt profiles:

$$A(\lambda, T, P) = \int_{-\infty}^{\infty} G(\lambda_0, \sigma) L(\lambda - \lambda_0, \gamma) d\lambda$$

where L is the Lorenztian profile and G is the centred Gaussian profile. For simplicity and computational Voigt profile for each absorption line of a gas are generated using a rational approximation in simulation by using a rapid MATLAB subroutine [22].

The product overlap between the absorption line spectrum and the FFP transmission spectrum is expressed as:

$$S_{FP}(\lambda, T) = A(\lambda) \cdot T_{FP}(\lambda, T),$$

and represents the output spectrum from the FP filter. At single-channel photodetector 22, the signal is the integral of the product above:

$$C(T) = \int_{\lambda_1}^{\lambda_2} S_{FP}(\lambda, T) d\lambda.$$

Figure 3A:
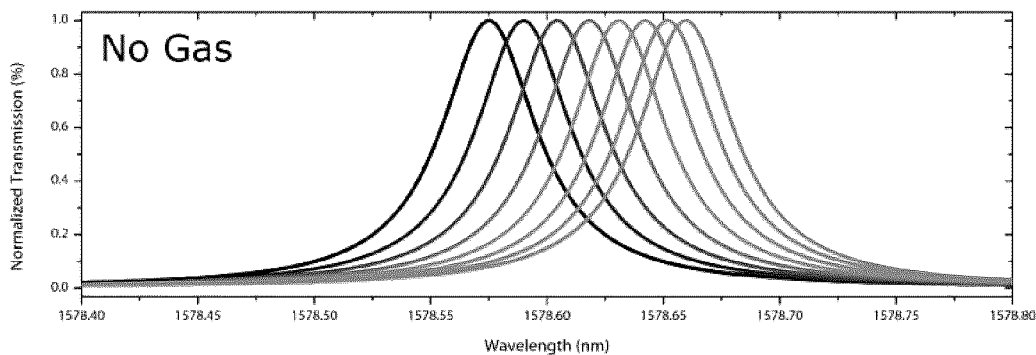
FIG. 3a shows a simulated transmission spectrum of the tunable FP filter as it is tuned to 1578.66 nm without any gas present.
Figure 3B:
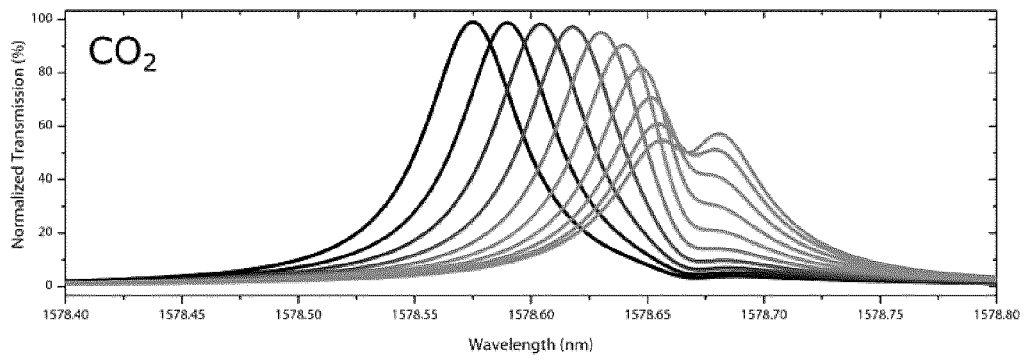
FIG. 3b shows a simulated transmission spectrum of the tunable FP filter as it is tuned to 1578.66 nm with carbon dioxide ($CO_2$) present.

The output from filter 18 is calculated as the product of the FFP filter 18 transmission and the normalized gas absorption spectrum. The input spectrum is modeled as a flat broadband spectrum with normally-distributed white noise. The absorption spectra of the gas is generated by importing absorption cross-sections from the high-resolution transmission molecular absorption database (HITRAN) and generating approximate Voigt profiles based on room temperature and pressure conditions. The FFP filter 18 transmission profile is controlled by setting the Voigt parameter sigma. The transmission central wavelength of filter 18 is modulated across a spectral absorption feature of $CO_2$. The simulated overlap of the absorption feature with the FFP filter 18 transmission window is shown in FIGS. 3a and 3b. In more detail, FIG. 3a shows a simulated transmission spectrum of tunable FP filter 18 as it is tuned to 1578.66 nm without any gas present, while FIG. 3b shows a simulated transmission spectrum of tunable FP filter 18 as it is tuned to 1578.66 nm with $CO_2$ present.

Figure 4A:
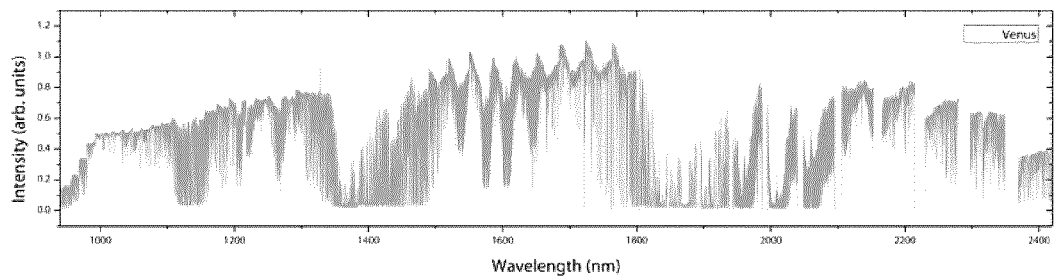
FIG. 4a shows a near-infrared spectrum of Venus acquired using the 3.58-meter Galileo National Telescope on Santa Cruz de La Palma with strong $CO_2$ absorption bands centred at 1580 nm and 1610 nm.
Figure 4B:
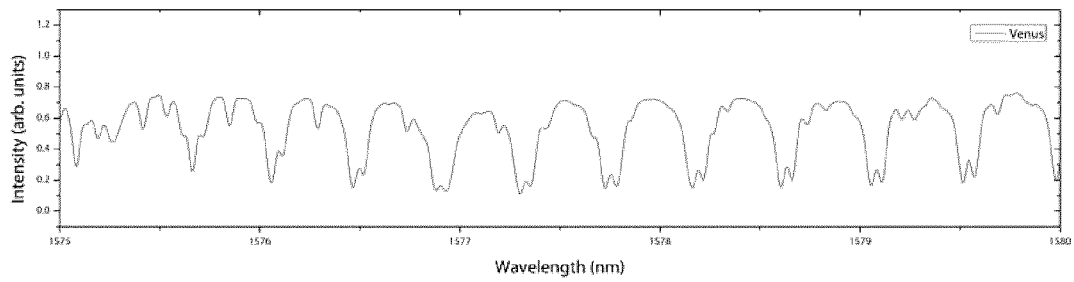
FIG. 4b shows a detailed view of the absorption line profiles, where the absorption peaks of both Earth and Venus are overlapping, separated by approximately 60 pm.

In one experimental setup, the reflection spectrum of Venus is measured. A near-infrared spectrum of Venus was acquired using the 3.58-meter Galileo National Telescope on Santa Cruz de La Palma and is shown in FIG. 4a. The spectrum reveals strong $CO_2$ absorption bands centred at 1580 nm and 1610 nm. A more detailed view of the absorption line profiles is also shown in FIG. 4b, where the absorption peaks of both Earth and Venus are overlapping, separated by approximately 60 pm. The telluric lines are removed from spectrum to produce the approximate spectrum of Venus alone. This spectrum is used as an input to the simulations to demonstrate the FFP filter-based detection of remote $CO_2$ detection.

For the detection of $CO_2$ using the absorption lines around 1580 nm, a sinusoidal modulation of the simulated FFP filter 18 transmission profile is introduced. The lock-in amplification is simulated according to the equation below as the transmission window of the FFP filter 18 is swept:

$$V_{out} = \frac{1}{T} \int_{t-T}^{t} \sin[2\pi f_{ref} t^* + \varphi] V_{in} dt^*$$

Figure 5:
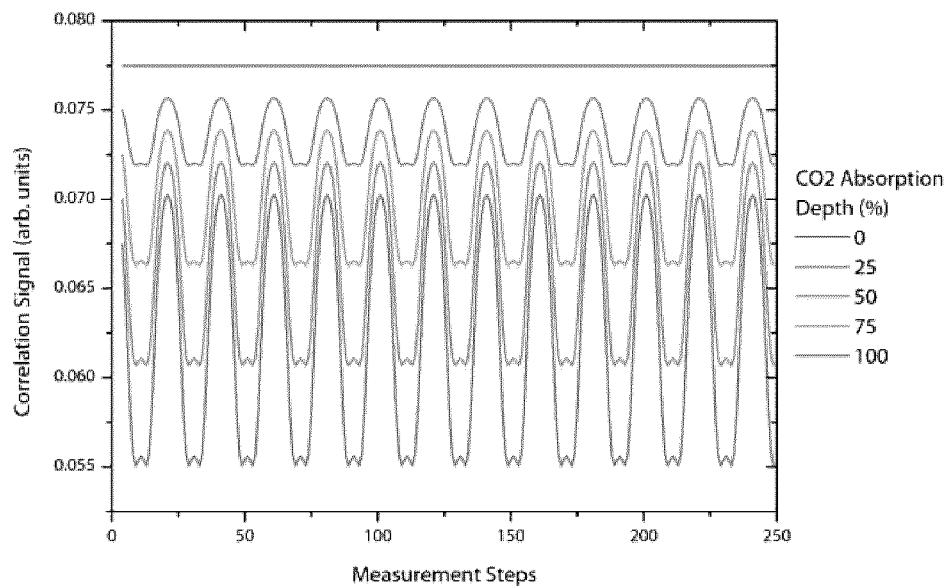
FIG. 5 shows a modulated signal as a function of measuring steps over time for various $CO_2$ absorption depths. The signal amplitude increases as a function of $CO_2$ absorption depth.

FIG. 5 shows a modulated signal as a function of measuring steps over time for various $CO_2$ absorption depths. The signal amplitude increases as a function of $CO_2$ absorption depth.

Figure 6:
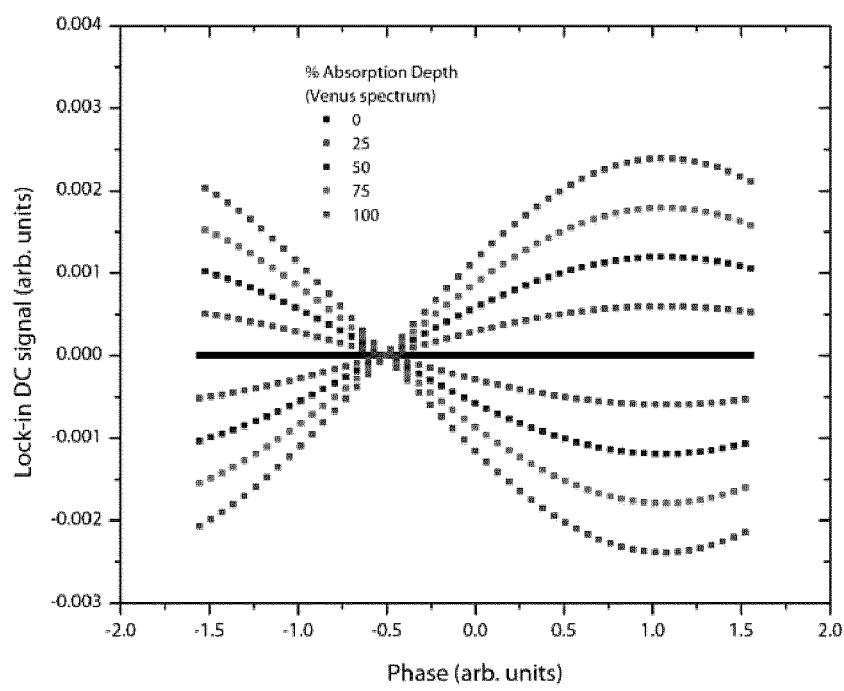
FIG. 6 shows a correlation signal as a function of phase showing the modulation amplitude increasing with absorption depth of the Venus spectrum.

FIG. 6 shows a correlation signal as a function of phase showing the modulation amplitude increasing with absorption depth of the Venus spectrum. As can be seem, with increasing $CO_2$ absorption depth, the amplitude of DC signal increases.

One of the benefits of lock-in amplifier 24 is the ability to measure the input signal phase. The phase of the lock-in signal from light passing through fiber FP filter 18 is proportional to the wavelength of the spectral feature. The two components of the lock-in signal can be used to obtain the phase of the lock-in signal using the equations below.

$$V_{sig} = \frac{2V_{out}}{\cos \theta}$$

$$X = V_{sig} \cos \theta$$

$$Y = V_{sig} \sin \theta$$

$$\theta = \tan^{-1}\left(\frac{Y}{X}\right)$$

Figure 7:
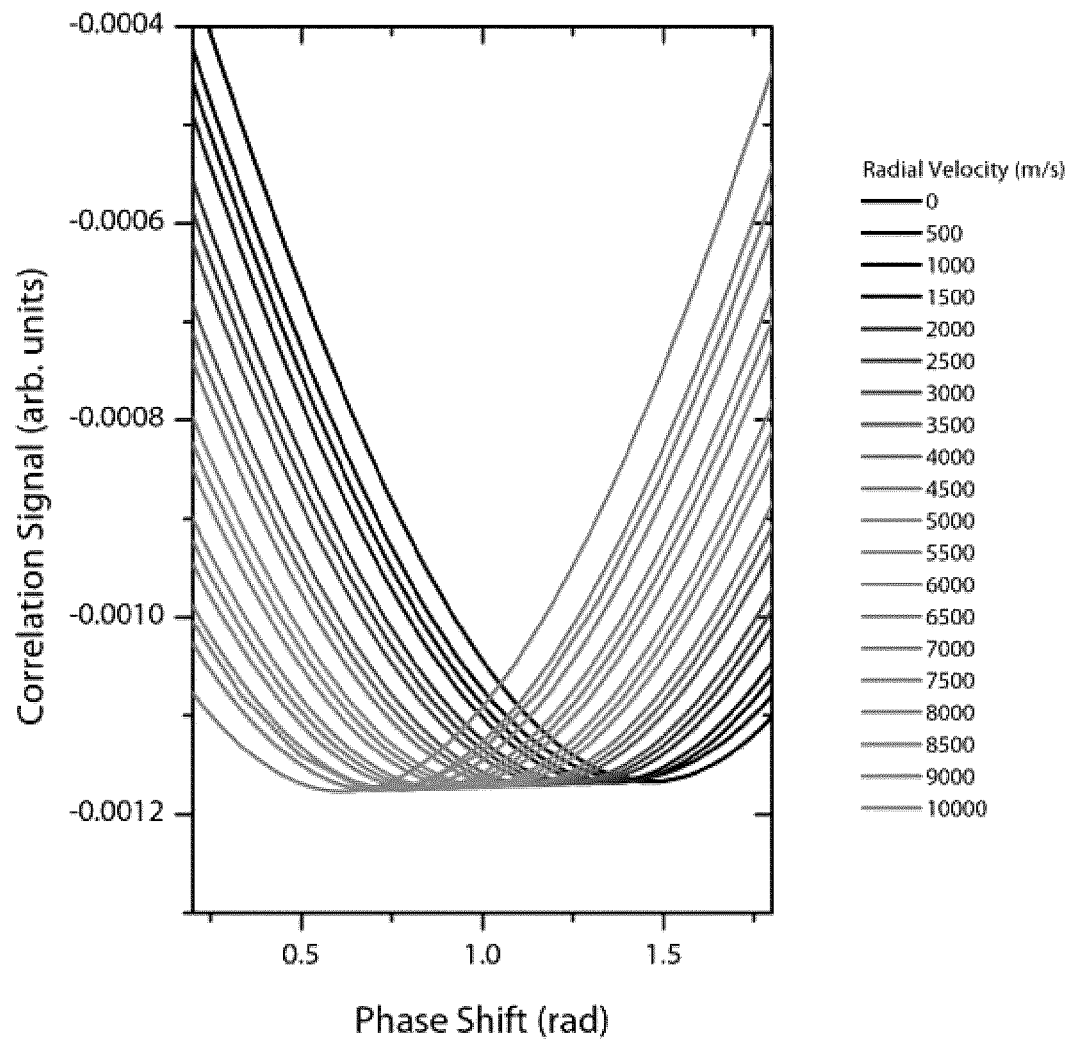
FIG. 7 shows a simulated correlation signal output from a lock-in amplifier output as a function of phase shift for various radial velocities.

In the case of a Doppler shift, the spectral shift is proportional to the radial velocity of the object. At 1578 nm, where carbon dioxide can be detected, the spectral shift can be over 1 nm with radial velocities up to 200 km/s. The DC signal from lock-in amplifier 24 is simulated as a function of spectral shift of a pure $CO_2$ spectrum due to non-zero radial velocity. FIG. 7 shows a simulated correlation signal output from lock-in amplifier 24 output as a function of phase shift for various radial velocities, with a change in the phase of the lock-in signal.

In the case of an ideal, single gas absorption spectrum, the radial velocity can be accurately determined by the phase shift of the lock-in signal. However with a complex spectrum with multiple absorption lines in the scanning region, the radial velocity to phase relation is affected from the spectral lines in the modulation range, leading to deviations in the radial velocity determination unless a calibration for that same spectrum is performed. Since the spectrum in most cases is not known, this can present a challenge in accurate determination of the radial velocity under complex spectra.

Figure 8A:
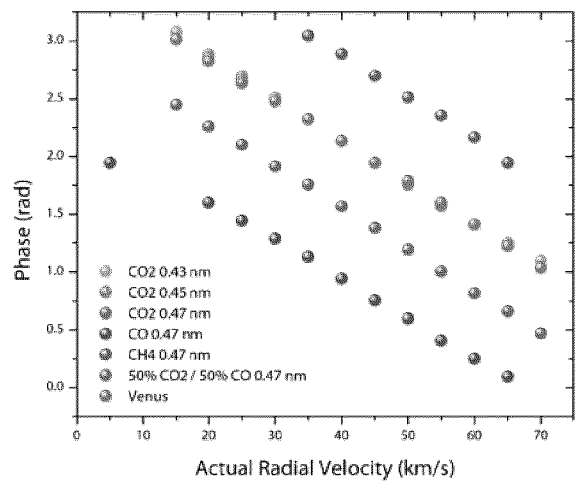
FIG. 8a shows a phase shift as a function of radial velocity of various redshifted spectra.

As there are multiple, roughly periodically spaced absorption lines for many gases, such as $CO_2$ and carbon monoxide (CO), these additional lines can be used to increase the selectivity of the gas sensing technique and reduce errors in the radial velocity measurement. By scanning in a larger range that is a multiple of the average line spacing, a higher order harmonic of the lock-in signal would also indicate the presence of the gas. This technique is less sensitive to other spectral features from other gases since their contribution is reduced relative to the signal from the target gas. This technique is used to extract the sixth harmonic signal from a modulation range that is six times the average spacing between $CO_2$ lines (6×0.47 nm), centred at 1580.2 nm, as shown in FIG. 8a. Gas identification is thus accomplished through their phase offsets relative to a calibrated phase for that gas. When there are both gas species, the phase of the lock-in signal is between that of both gases, with the measured phase being a function of each gases contribution to the total absorption over the modulation range of FFP filter 18.

Figure 8B:
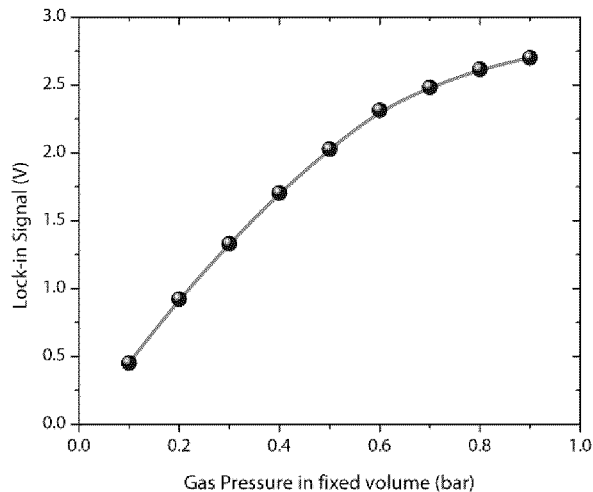
FIG. 8b shows a voltage of a lock-in signal plotted as a function of gas pressure.

Accordingly, an acquired spectrum of Venus may be characterized by system 10 using a simulated tunable FFP filter 18 transmission spectrum, a FFP spectral modulation amplitude sufficient to cover 1 nm spectral bandwidth and processing the output of the FFP analog lock-in amplifier 24. Calibration of the sensor with a non-Doppler shifted spectral lines is performed to obtain reference phase signal for radial velocity determination. A phase shift relative to the reference phase can be related to a Doppler shifted feature. In FIG. 8a, the phase of the lock-in signal is plotted as a function of simulated radial velocity for various spectra. For various $CO_2$-optimized modulation ranges, the phase shift as a function of radial velocity is relatively unchanged. With the addition of CO, relationship is offset towards the trend for pure CO, which indicates the possibility to use the phase offset to infer relative gas ratios. The reflection spectrum of Venus is nearly indistinguishable to that of pure $CO_2$, due to the strong $CO_2$ absorption lines in the spectrum, showing that the technique can operate under complex spectra such as that of Venus. In FIG. 8*b*, the voltage signal (V) of the lock-in signal is plotted as a function of gas pressure, derived from the experimental data.

Figure 9:
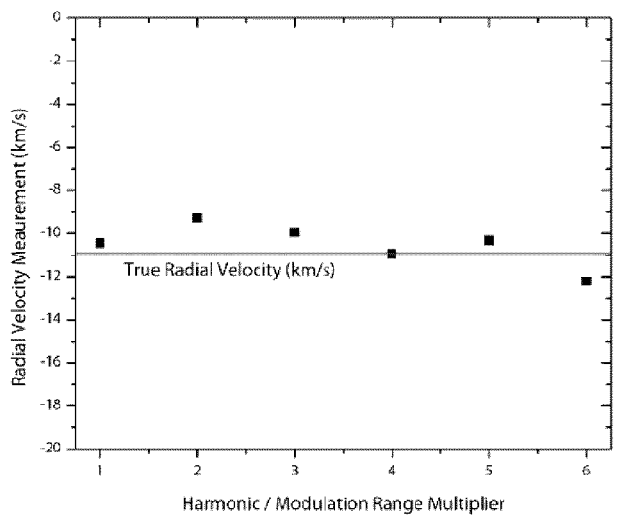
FIG. 9 shows the radial velocity extracted from the Venus spectrum for increasing harmonics/modulation ranges of detection.

It should be noted that since the simulation uses a spectrum of Venus acquired with a spectrometer with limited spectral resolution, the spectrum contains artificially broadened spectral lines that significantly reduces the accuracy of the radial velocity determination. The radial velocity of Venus at the point of spectral acquisition by the TNG telescope was determined to be −10.92 km/s using the NASA JPL Solar system dynamics HORIZONS web interface. The measured NIR spectrum of Venus is overlapped with the transmission window of FFP filter 18 to simulate the output lock-in amplifier signal. The phase offset is extracted and compared to the phase offsets using a pure $CO_2$ spectrum over a range of radial velocities. The radial velocity at which the $CO_2$ phase offset matches that of Venus spectrum indicating the approximate radial velocity of Venus. The radial velocities were determined with modulation ranges from 1-6 line spacings and shown in FIG. 9. If averaged over all harmonic multipliers, the radial velocity obtained is −10.52 km/s, which has an error of approximately 3.6% from the true value. The true radial velocity of Venus at the time of acquisition is shown as the horizontal line.

In another implementation, system 10 comprises a sensor comprising the lock-in amplifier and a multi-channel detector capable of any one of: monitoring remote gases; detecting a gas comprising quasi-periodic absorption lines; detecting a gas comprising complex absorption spectra; monitoring emissions from remote sources; and exoplanet detection and characterization.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

REFERENCES

1. I. Coddington, N. Newbury, and W. Swann, "Dual-comb spectroscopy," Optica 3, 414-426 (2016).
2. I. Coddington, W. C. Swann, and N. R. Newbury, "Coherent dual-comb spectroscopy at high signal-to-noise ratio," Physical Review A 82, 043817 (2010).
3. A. Perot and C. Fabry, "On the Application of Interference Phenomena to the Solution of Various Problems of Spectroscopy and Metrology," The Astrophysical Journal 9, 87 (1899).
4. J. Kuhn, U. Platt, N. Bobrowski, and T. Wagner, "Towards imaging of atmospheric trace gases using Fabry—Perot interferometer correlation spectroscopy in the UV and visible spectral range," Atmos. Meas. Tech. 12, 735-747 (2019).
5. J. Kuhn, N. Bobrowski, P. Lübcke, L. Vogel, and U. Platt, "A Fabry—Perot interferometer-based camera for two-dimensional mapping of $SO_2$ distributions," Atmos. Meas. Tech. 7, 3705-3715 (2014).
6. E. Vargas-Rodriguez and H. N. Rutt, "Design of CO, $CO_2$ and CH4 gas sensors based on correlation spectroscopy using a Fabry—Perot interferometer," Sensors and Actuators B: Chemical 137, 410-419 (2009).
7. W. Ma, R. Wang, Q. Rong, Z. Shao, W. Zhang, T. Guo, J. Wang, and X. Qiao, "$CO_2$ Gas Sensing Using Optical Fiber Fabry—Perot Interferometer Based on Polyethyleneimine/Poly(Vinyl Alcohol) Coating," IEEE Photonics Journal 9, 1-8 (2017).
8. Y. Jiang and W. Ding, "Recent developments in fiber optic spectral white-light interferometry," Photonic Sensors 1, 62-71 (2011).
9. L. Zhang, Y. Jiang, H. Gao, J. Jia, Y. Cui, W. Ma, S. Wang, and J. Hu, "A diaphragm-free fiber Fabry-Perot gas pressure sensor," Review of Scientific Instruments 90, 025005 (2019).
10. G. Costa, P. Gouvea, L. Soares, J. M. Pereira, F. Favero, A. Braga, P. Palffy-Muhoray, A. Bruno, and I. C. Carvalho, "In-fiber Fabry-Perot interferometer for strain and magnetic field sensing," Optics Express 24, 14690 (2016).
11. H. Li, D. Li, C. Xiong, W. Si, C. Fu, P. Yuan, and Y. Yu, "Low-Cost, High-Performance Fiber Optic Fabry—Perot Sensor for Ultrasonic Wave Detection," Sensors (Basel) 19, 406 (2019).
12. X. Yin, Y. Shen, D. Su, and Z. Shao, "High-spatial-resolution ultrasonic sensor using a fiber-optic Fabry—Perot interferometer," Optics Communications 453, 124422 (2019).
13. B. Zhou, H. Jiang, C. Lu, and S. He, "Hot Cavity Optical Fiber Fabry-Perot Interferometer as a Flow Sensor With Temperature Self-Calibrated," Journal of Lightwave Technology 34, 5044-5048 (2016).
14. S. Pevec and D. Donlagic, "Miniature fiber-optic Fabry-Perot refractive index sensor for gas sensing with a resolution of 5×10-9 RIU," Opt. Express 26, 23868-23882 (2018).
15. S. Wu, L. Wang, X. Chen, and B. Zhou, "Flexible Optical Fiber Fabry—Perot Interferometer Based Acoustic and Mechanical Vibration Sensor," Journal of Lightwave Technology 36, 2216-2221 (2018).
16. A. Javernik and D. Donlagic, "Miniature, micromachined, fiber-optic Fabry-Perot voltage sensor," Opt. Express 27, 13280-13291 (2019).
17. M. Mozafari, Z. Sanjabi, and N. Granpayeh, "Design and fabrication of piezo-optical Fabry-Perot voltage sensor," in 2008 IEEE Avionics, Fiber-Optics and Photonics Technology Conference (2008), pp. 39-40.
18. B. Zhou, H. Jiang, R. Wang, and C. Lu, "Optical Fiber Fabry—Perot Filter With Tunable Cavity for High-Precision Resonance Wavelength Adjustment," J. Lightwave Technol. 33, 2950-2954 (2015).
19. D. Hays, A. Zribi, S. Chandrasekaran, S. Goravar, S. Maity, L. R. Douglas, K. Hsu, and A. Banerjee, "A Hybrid MEMS—Fiber Optic Tunable Fabry—Perot Filter," Journal of Microelectromechanical Systems 19, 419-429 (2010).
20. D. Jáuregui-Vázquez, J. M. Estudillo-Ayala, R. Rojas-Laguna, E. Vargas-Rodriguez, J. M. Sierra-Hernandez, J. C. Hernández-Garcia, and R. I. Mata-Chavez, "An all fiber intrinsic Fabry-Perot Interferometer based on an air-microcavity," Sensors (Basel) 13, 6355-6364 (2013).

21. N. Ismail, C. C. Kores, D. Geskus, and M. Pollnau, "Fabry-Pérot resonator: spectral line shapes, generic and related Airy distributions, linewidths, finesses, and performance at low or frequency-dependent reflectivity," Opt. Express 24, 16366-16389 (2016).

22. S. Abrarov, A Rational Approximation of the Voigt Function (n.d.).

The invention claimed is:

1. A method for detecting and identifying a remote gas, the method comprising the steps of:
    receiving a light wave associated with the remote gas;
    coupling the light wave into a single mode fibre;
    transmitting the light wave via the single mode fibre into a filter comprising a fibre-based tunable cavity;
    modulating the cavity length of the filter transmission window to cause a detected modulated signal that is proportional to the spectral feature; and
    processing the signal using a lock-in amplifier capable of low-pass filtering and out-of-frequency noise rejection, wherein an output from the lock-in amplifier is a function of a phase shift due to a radial velocity of the remote gas.

2. The method of claim 1, wherein the filter is a fibre-based Fabry-Pérot filter, wherein the low-pass filtering is performed by fiber-optic components.

3. The method of claim 1, wherein the remote gas is detected based on its absorption or emission features in at least one of a visible portion, mid-infrared portion and near-infrared portion of an electromagnetic wave spectrum.

4. The method of claim 2, wherein the remote gas is detected based on its absorption features in a pure carbon dioxide spectrum, wherein the pure carbon dioxide spectrum comprises spectral features with linewidths similar or smaller than a linewidth of the fiber Fabry Perot filter.

5. The method of claim 2, wherein the remote gas is detected based on its absorption features in a pure carbon monoxide spectrum, wherein the pure carbon monoxide spectrum comprises spectral features with linewidths similar or smaller than a linewidth of the fiber Fabry Perot filter.

6. The method of claim 2, wherein the remote gas is detected based on its absorption features in a mixture of carbon dioxide and carbon monoxide spectrum, wherein the mixture of carbon dioxide and carbon monoxide spectrum comprises spectral features with linewidths similar or smaller than a linewidth of the fiber Fabry Perot filter.

7. The method of claim 2, wherein the remote gas is detected based on its absorption features in a methane spectrum, wherein the methane spectrum comprises spectral features with linewidths similar or smaller than a linewidth of the fiber Fabry Perot filter.

8. The method of claim 2, wherein the remote gas is detected based on its absorption features in a measured near-infrared spectrum of Venus, wherein the spectrum of Venus comprises spectral features with linewidths similar or smaller than a linewidth of the fiber Fabry Perot filter.

9. The method of claim 1, wherein a sensor comprising the lock-in amplifier and a single channel detector is tailored to detect a gas comprising quasi-periodic absorption lines.

10. The method of claim 1, wherein a sensor comprising the lock-in amplifier and a single channel detector is tailored to detect a gas comprising complex absorption spectra.

11. The method of claim 10, wherein the sensor comprising the lock-in amplifier and a single channel detector is configured for monitoring emissions from remote sources.

12. The method of claim 10, wherein the sensor comprising the lock-in amplifier and a multi-channel detector is configured for monitoring remote gases.

13. The method of claim 11, wherein the sensor is configured for remote sensing.

14. The method of claim 11, wherein the sensor extracts radial velocities of the remote gas from a phase of the lock-in correlation amplitude for identifying the remote gas.

15. A gas sensing system comprising:
    a fibre collimator for receiving a light wave associated with a remote gas;
    a single mode fibre for receiving the light wave coupled thereinto by the fibre collimator;
    a filter comprising a fibre-based tunable cavity, wherein the cavity receives the light wave via the single mode fibre;
    a modulator for modulating the cavity length;
    a single-channel photodetector for detecting a modulated signal that is proportional to the spectral feature;
    a single channel lock-in amplifier capable of low-pass filtering and out-of-frequency noise rejection, wherein an output from the lock-in amplifier is a function of a phase shift due to a radial velocity of the remote gas.

16. The gas sensing system of claim 15, wherein the remote gas is detected based on its absorption features in at least one of a visible portion, mid-infrared portion and near-infrared portion of an electromagnetic wave spectrum.

* * * * *